Oct. 7, 1958     E. W. KIELSMEIER     2,855,312

TELESCOPIC STICK FOR ICE CREAM BAR

Filed Nov. 4, 1955

INVENTOR.
ELWOOD W. KIELSMEIER
BY R. G. Story
ATTORNEY

United States Patent Office 2,855,312
Patented Oct. 7, 1958

2,855,312

TELESCOPIC STICK FOR ICE CREAM BAR

Elwood W. Kielsmeier, Fond du Lac, Wis., assignor to Swift & Company, Chicago, Ill., a corporation of Illinois Application November 4, 1955, Serial No. 544,898

4 Claims. (Cl. 99—137)

This invention relates generally to improvements in food products and more specifically to a solidified food product having a telescopic stick embedded therein.

Solidified or congealed food products and confections having rigid sticks provided as handles are well known. These confections are commonly referred to as "frozen suckers" or "ice-cream bars" and are normally sold through ordinary retail outlets. In recent years, other means for distribution have become popular such as automatic coin vending machines, and small vehicles having refrigerated compartments, which can be driven into residential areas so that frozen products may be sold on the street. In all forms of distribution, and especially in the above mentioned recent innovations, the problem of economical and space-saving packaging and storage is substantial. In the case of the conventional frozen sucker, the extending portion of the stick accounts for from one-third to one-half of the full length. In other words, the storage space necessary for the suckers is materially increased over that which would be needed for the frozen portion without the extending stick.

Various methods have been proposed to alleviate these difficulties. Some manufacturers have attempted to solve the problem by distributing the frozen confection and the handles separately. However, this method has the disadvantages of being time consuming at the time of sale. There is also the possibility of the separate sticks being misplaced or lost, or becoming soiled and unsightly during distribution and handling.

It is therefore an object of this invention to provide a frozen confection on a stick which overcomes these prior art difficulties.

An additional object of the invention is to provide a frozen ice cream bar on a stick which has both the advantage of reduced storage space and the inclusion of the stick as an integral part of the frozen confection package.

Further objects and advantages of this invention if not specifically set out will become apparent from the description and claims which follow.

Broadly, the present invention relates to a frozen ice cream bar comprising a confection hardened on a telescopic stick of at least two cooperating parts, a socket member and a handle member. The socket member is preferably formed of moisture resistant material and is serrated on its surface to keep it firmly embedded in the confection. Preferably, it is closed at the interior end and open at the outer end thereof. The handle member is preferably of the conventional "stick" variety and normally positioned substantially within the socket member. The socket member is provided with suitable means to prevent complete removal of the handle from the socket and is further provided with resilient means to secure the handle member in the extended position.

Figure 3:
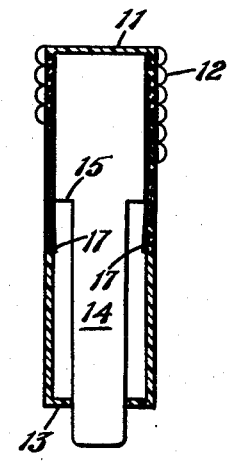
Figure 3 is a sectional view similar to Figure 2 showing the stick in the recessed position, suitable for transport or storage.
Figure 5:
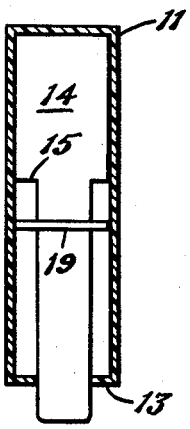
Figure 5 is a front elevation also in section showing the modification of Figure 4 in the recessed position.

Referring now to the drawings, wherein like figures represent like parts, 10 indicates generally a frozen confection having a moisture resistant socket member 11 embedded therein. The socket member is provided with serrations or roughened edges 12 to aid in firmly retaining the socket in the confection. At the exterior end, the socket member is provided with a flanged neck 13. A handle member 14 preferably of wood or plastic is of decreased cross section at its lower end so as to form shoulders 15 adapted to cooperate with flanges 13 to prevent complete removal from the socket member. A short portion or tab of the handle 14 protrudes from the socket member, as shown in Figures 3 and 5.

Figure 1:
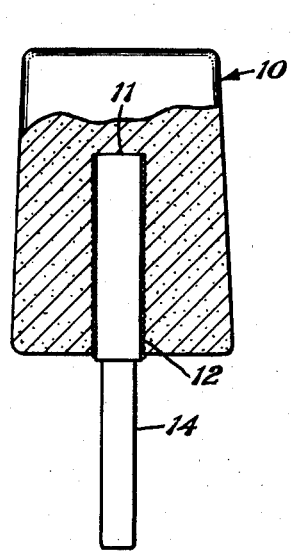
Figure 1 is a front elevation partly in section showing a frozen confection with the telescopic stick in the extended position.
Figure 2:
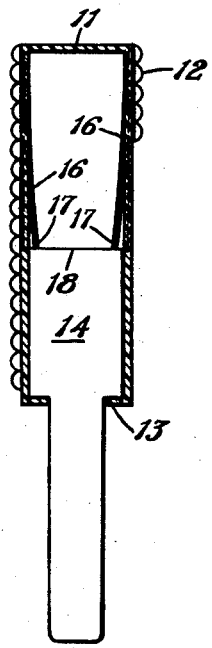
Figure 2 is a front elevation in section showing the telescopic stick portion of the invention and illustrating the manner in which the handle member is positioned in the socket member when in the extended position.
Figure 4:
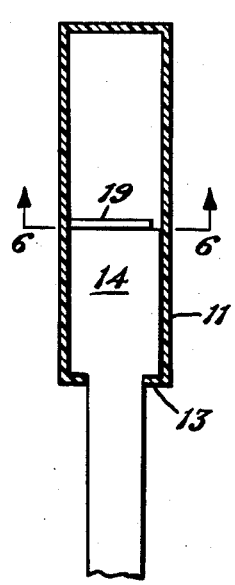
Figure 4 is a front elevation in section illustrating a modified form of the stick in the extended position.
Figure 6:
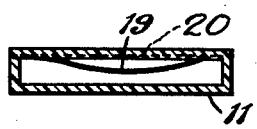
Figure 6 is a fragmentary transverse sectional view of the socket taken along the line 6—6 of Figure 4.

The socket member is provided with means to secure the handle member in the extended position and prevent it from sliding back into the socket member while the confection is being eaten. In the modification shown in Figures 2 and 3, the means to secure the handle member comprise resilient spring members 16. One end of each is fixedly mounted internally at either side of the interior end of the socket member 11. Ends 17 of the spring members are freely mounted and normally urged in an inwardly direction. When the handle member is in the recessed position as shown in Figure 3, the free ends of the spring members rest on the sides of said handle member. When the handle has been extended as shown in Figure 2, the free ends of the spring members are urged inwardly and rest against the interior end portion 18 of the handle member 14. In Figures 4 and 5 another modification appears in which the means to secure the handle member when in the extended position comprises an arcuate spring member 19 mounted laterally in recess 20 in the socket member preferably in a position approximately half-way between the end and the exterior neck portion thereof. Variations are possible, but the best balance between stick concealment (when recessed) and strength (when extended) is achieved when the resilient arcuate member is placed at the socket midpoint and the handle also has its shoulders at its own midpoint. One end of the spring is fixedly mounted at one side of the recess in the socket member, and the other end is freely mounted. The central portion of the spring member is urged inwardly when the handle member is in the normal position shown in Figure 5 and one surface of the spring member rests against the handle. When the handle is extended as in Figure 4, the spring member is released from the recess and assumes the arcuate shape shown in Figure 6.

The term "telescopic stick" is used in the sense that rather than the conventional unyielding stick, this invention provides for a stick of at least two cooperating parts which allow the handle member to be normally recessed within the socket member so as to leave only a protruding short tab. In operation of the stick, the handle member is extended by pulling out the tab until the shoulders 15 of the handle meet and cooperate with flanges 13 of the socket. As the shoulders meet the flanges, resilient springs 17 and 19 are released and act to prevent the handle from sliding back into the socket while the confection is being eaten.

While attention has been directed in the discussion above to the use of a socket member for insertion in the frozen confection having a serrated edge for better gripping action, it is to be borne in mind that other means for securely holding the socket in place in the confection are suitable. For example, the external surface of the socket member might simply be roughened or might have an enlarged top, either flangelike or in the shape of a knob. Also, while not preferred, it is possible to simply freeze the smooth-surfaced socket in place—in the fashion commonly employed in making confections of this type. However, the reason for a rough surface on the socket becomes apparent when it is recognized that at the time of freezing the confection, not only will the socket be frozen in place but the extensible handle frozen solidly in a retracted position in the socket. Thus, when an attempt is made to extend the handle, there is danger that the entire socket-bearing stick might be loosened and withdrawn.

The telescopic stick herein described is adapted for use with any type of edible substances to be eaten from a stick. While particularly adapted to be used with a frozen confection or "ice cream bar," it is also adaptable to be used with other products both frozen and unfrozen. The socket member is preferably formed of water resistant paper or plastic but may be formed of metal or any other moisture resistant material. The handle member, while preferably wood, may be made from plastic or composition substances or other light, rigid material.

Obviously, many modifications and variations of the invention as hereinbefore set forth may be made without departing from the spirit and scope thereof, and therefore only such limitations should be imposed as are indicated in the appended claims.

I claim:

1. A food product comprising: a body of confection and an extensible stick embedded therein, said stick consisting of a socket member provided with flanges at the outer end thereof; and a handle member of decreased cross section at its lower end forming shoulders adapted to coact with said flanges to prevent the handle member from being completely removed from the socket member.

2. A food product comprising a body of confection and an extensible stick embedded therein, said stick consisting of a socket member provided with flanges at the outer end thereof; and a handle member of decreased cross section at its lower end forming shoulders adapted to coact with said flanges to prevent the handle member from being completely removed from the socket member, said socket member also being provided with means to fixedly secure the handle member in an extended position.

3. A food product comprising a body of frozen confection and an extensible stick embedded therein, said stick consisting of a serrated moisture and fat resistant socket member provided with flanges at the outer end thereof; and a handle member of decreased cross section at its lower end forming shoulders adapted to coact with said flanges to prevent the handle member from being completely removed from the socket member, said socket member also being provided with a resilient member, one end of said resilient member being fixedly mounted internally of said socket member at the interior end thereof, the alternate end of said resilient member being freely mounted and urged in an inwardly direction whereby to rest upon one side of the handle member when said handle is in the recessed position and to rest against the end portion of said handle when in the extended position whereby to secure said handle member in said extended position.

4. A food product comprising a body of frozen confection and an extensible stick embedded therein, said stick consisting of a serrated moisture and fat resistant socket member provided with flanges at the outer end thereof; and a handle member of decreased cross section at its lower end forming shoulders adapted to coact with said flanges to prevent the handle member from being completely removed from the socket member, said socket member also being provided with a laterally mounted resilient member, one end being fixedly secured at one side internally of the socket member and a portion of said resilient member being urged against one side of said handle member when said handle is recessed, said resilient member being adapted to abut against the end portion of said handle member when in the extended position whereby to secure said handle member in said extended position.

References Cited in the file of this patent

UNITED STATES PATENTS

| | | |
|---|---|---|
| 1,048,837 | Jessup | Dec. 31, 1912 |
| 1,297,452 | Elmer | Mar. 18, 1919 |
| 1,406,841 | Foss | Feb. 14, 1922 |
| 1,768,425 | Smith | June 24, 1930 |
| 1,952,688 | Schnaier | Mar. 27, 1934 |
| 2,085,330 | Price | June 29, 1937 |
| 2,595,597 | Morseth | May 6, 1952 |